(12) United States Patent
Rivolta et al.

(10) Patent No.: US 11,280,634 B2
(45) Date of Patent: *Mar. 22, 2022

(54) SYSTEM, METHOD AND ARTICLE FOR COUNTING STEPS USING AN ACCELEROMETER

(71) Applicant: STMicroelectronics S.r.l., Agrate Brianza (IT)

(72) Inventors: Stefano Paolo Rivolta, Desio (IT); Andrea Labombarda, Milan (IT); Alberto Zancanato, Busto Garolfo (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,874

(22) Filed: Jun. 6, 2019

(65) Prior Publication Data

US 2019/0310103 A1 Oct. 10, 2019

Related U.S. Application Data

(63) Continuation of application No. 15/287,437, filed on Oct. 6, 2016, now Pat. No. 10,359,296.

(60) Provisional application No. 62/238,513, filed on Oct. 7, 2015.

(51) Int. Cl.
*G01C 22/00* (2006.01)

(52) U.S. Cl.
CPC .................... *G01C 22/006* (2013.01)

(58) Field of Classification Search
CPC ...... G01P 21/00; G01C 22/006; A61B 5/1123
See application file for complete search history.

(56) References Cited

U.S. PATENT DOCUMENTS

| 2014/0074431 A1 | 3/2014 | Modi |
| 2014/0167973 A1* | 6/2014 | Letchner ............... H04Q 9/00 340/870.02 |
| 2014/0180621 A1 | 6/2014 | Poduri et al. |

* cited by examiner

*Primary Examiner* — Lam S Nguyen
(74) *Attorney, Agent, or Firm* — Seed IP Law Group LLP

(57) ABSTRACT

An activity tracking device, such as a step-counting device includes an interface configured to receive one or more acceleration signals and signal processing circuitry. The signal processing circuitry generates an indication of condition of an accelerometer, such as a body position of the accelerometer, based on one or more accelerometer signals, generates an event signal, such as an event flag, based on one or more accelerometer signals and the indication of the condition of the accelerometer, and generates an activity signal, such as step flag based on the event signal, the indication of the condition of the accelerometer and one or more acceleration signals. The signal processing circuitry may generate a noise signal based on one or more acceleration signals and generate the activity signal based on the noise signal.

28 Claims, 5 Drawing Sheets

SYSTEM, METHOD AND ARTICLE FOR COUNTING STEPS USING AN ACCELEROMETER

BACKGROUND

Technical Field

The present description relates to systems, methods and articles for counting steps using an accelerometer, such as a wearable accelerometer.

Description of the Related Art

A pedometer is a portable electronic, mechanical or electromechanical device that counts steps taken by a person.

Pedometers may be employed in various devices, such as, for example, fitness, pedestrian dead reckoning (PDR) and other portable and wearable devices in order to count steps taken by a person. The count may be employed to estimate distance traveled, to recognize activities (e.g., run, walk, etc.), to estimate calories burned, etc. In PDR devices, for example, a count may be used to estimate the position of a person alone or in combination with other positioning signals, such as global positioning signals (GPS), radio signals, etc. The accuracy of the pedometer may impact the accuracy of the estimates.

Pedometers may be incorporated into clothing and accessories, for example, in the form of embedded electronic devices, and may be incorporated into various electronic devices, such as mobile phones, personal devices, etc.

BRIEF SUMMARY

In an embodiment, a method comprises: generating an indication of a condition related to an accelerometer based on one or more accelerometer signals; generating an event signal based on the one or more accelerometer signals and the indication of the condition related to the accelerometer; and generating an activity signal based on the event signal, the indication of the condition related to the accelerometer and the one or more accelerometer signals. In an embodiment, the method comprises: generating a noise signal based on the one or more accelerometer signals; and generating the activity signal based on the noise signal. In an embodiment, the indication of the condition related to the accelerometer is an indication of a body position of the accelerometer, the activity signal is a step signal and the method comprises generating a step count signal based on the step signal. In an embodiment, the method comprises: generating a noise signal based on the one or more accelerometer signals; and generating the step count signal based on the noise signal and the step signal. In an embodiment, the indication of the condition related to the accelerometer is an indication of a body position of the accelerometer. In an embodiment, the event signal comprises an event flag, and the method comprises generating the activity signal based on one or more acceleration data blocks associated with the event flag. In an embodiment, the method comprises controlling an application program based on the activity signal. In an embodiment, the generating the indication of the condition related to the accelerometer based on one or more accelerometer signals comprises determining a body position of the accelerometer using one or more statistical classifiers. In an embodiment, the generating the event signal based on the one or more accelerometer signals and the indication of the condition related to the accelerometer comprises selecting event trigger criteria based on the indication of the condition. In an embodiment, the generating the activity signal based on the event signal, the indication of the condition related to the accelerometer and the one or more accelerometer signals comprises selecting a statistical classifier from a plurality of statistical classifiers based on the indication of the condition. In an embodiment, a non-transitory computer-readable medium's contents cause a signal processing circuitry to perform an embodiment of the methods disclosed herein. In an embodiment, the contents comprise instructions executed by the signal processing circuitry.

In an embodiment, a device comprises: an interface configured to receive acceleration signals: and acceleration signal processing circuitry, which, in operation: generates an indication of a condition related to an accelerometer based on one or more acceleration signals; generates an event signal based on the one or more acceleration signals and the indication of the condition related to the accelerometer; and generates an activity signal based on the event signal, the indication of the condition related to the accelerometer and the one or more acceleration signals. In an embodiment, the acceleration signal processing circuitry, in operation, generates a noise signal based on the one or more acceleration signals; and generates the activity signal based on the noise signal. In an embodiment, the indication of the condition related to the accelerometer is an indication of a body position of the accelerometer, the activity signal is a step signal and the signal processing circuitry, in operation, generates a step count signal based on the step signal. In an embodiment, the acceleration signal processing circuitry, in operation, generates a noise signal based on the one or more acceleration signals; and generates the step count signal based on the noise signal and the step signal. In an embodiment, the indication of the condition related to the accelerometer is an indication of a body position of the accelerometer. In an embodiment, the device comprises: a plurality of data buffers, wherein the event signal comprises an event flag, and the acceleration signal processing circuitry, in operation, generates the activity signal based on one or more acceleration data blocks associated with the event flag and stored in the plurality of data buffers. In an embodiment, the device comprises: an application processor, which, in operation, controls an application program based on the activity signal. In an embodiment, the acceleration signal processing circuitry, in operation, generates the indication of the condition related to the accelerometer based on the one or more acceleration signals by determining a body position of the accelerometer using one or more statistical classifiers. In an embodiment, the acceleration signal processing circuitry, in operation, generates the event signal based on the one or more acceleration signals and the indication of the condition related to the accelerometer by selecting event trigger criteria based on the indication of the condition. In an embodiment, the acceleration signal processing circuitry, in operation, generates the activity signal based on the event signal, the indication of the condition related to the accelerometer and the one or more acceleration signals by selecting a statistical classifier from a plurality of statistical classifiers based on the indication of the condition. In an embodiment, the signal processing circuitry comprises: one or more filters configured to filter received acceleration signals. In an embodiment, the one or more filters comprise at least one of: a low-pass filter; and a high-pass filter.

In an embodiment, a system comprises: an accelerometer configured to generate one or more acceleration signals; and signal processing circuitry, which, in operation: generates an indication of a condition related to the accelerometer based on one or more acceleration signals; generates an event signal based on the one or more acceleration signals and the indication of the condition related to the accelerometer; and generates an activity signal based on the event signal, the indication of the condition related to the accelerometer and the one or more acceleration signals. In an embodiment, the system comprises: an integrated circuit including the signal processing circuitry. In an embodiment, the integrated circuit includes the accelerometer. In an embodiment, the system comprises: a transmitter configured to transmit the generated activity signal. In an embodiment, the system comprises a display or other device to show the counted steps.

DETAILED DESCRIPTION

Figure 1:
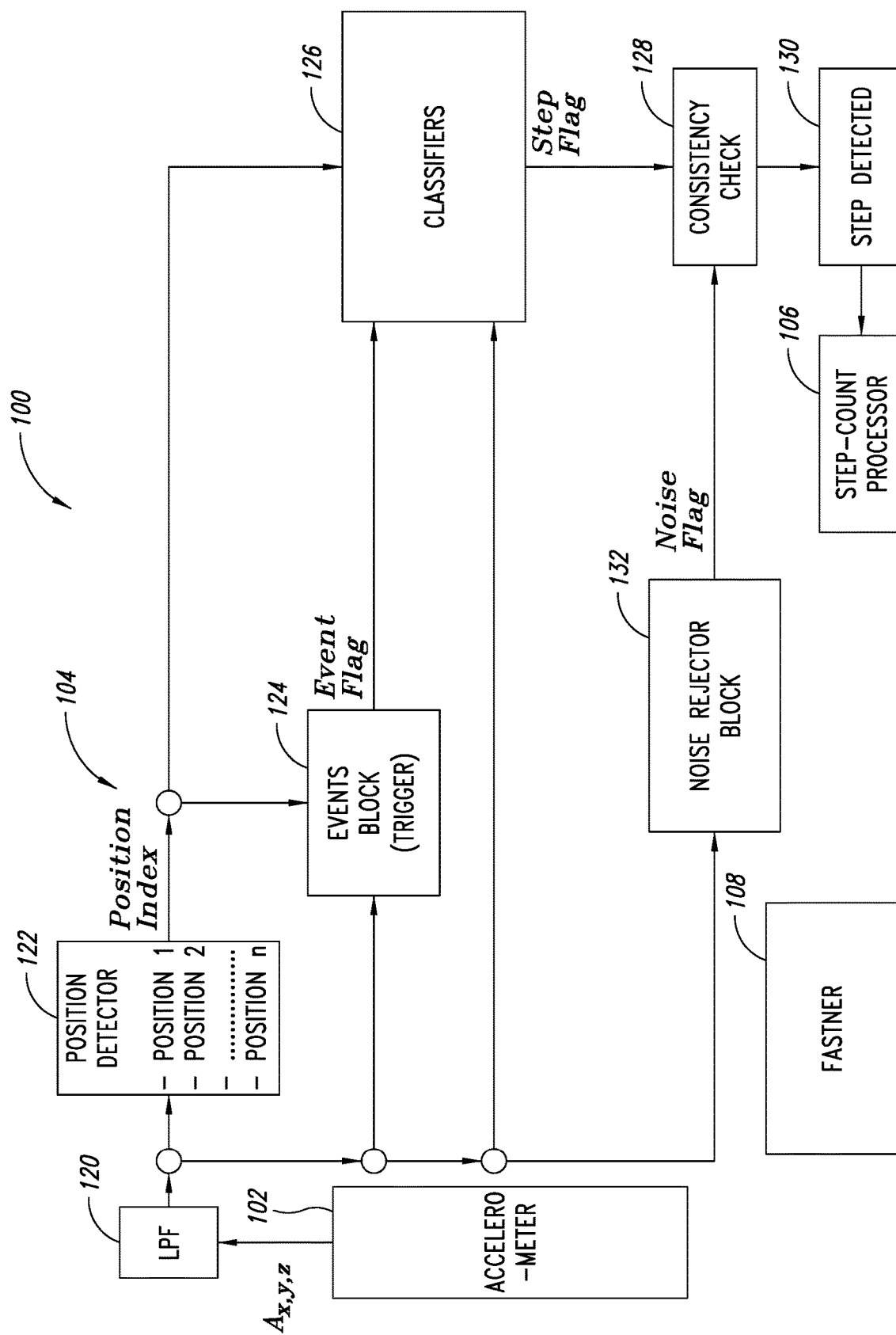
FIG. 1 is a functional block diagram of an embodiment of a system to count steps.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, accelerometers, signal processing circuitry, mobile devices such as smart phones, computing systems, telecommunication networks, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

A pedometer is a portable electronic, mechanical or electromechanical device that counts steps taken by a person. Wearable pedometer devices to count steps are known. The devices may be worn by a user, for example, in a wrist position, a belt position, a chest position, a foot position, a thigh position, etc. The devices may typically comprise an accelerometer and circuitry configured to analyze the output of the accelerometer in the time and/or frequency domain to generate a step count. Filters or filtering may be employed to remove unwanted components or feature of a signal, such as a signal indicative of step count data generated by a wearable device. Statistical classification may be employed to classify data of an observation. For example, a neural network trained using a training data set may be employed to classify signal data as indicative, or not indicative, of a step.

False positives sometimes occur when a result indicates a condition has occurred, when in fact the condition has not occurred. For example, a vibration may generate data which is similar to a walk pattern, which may result in a false positive step count when, in fact, no steps have been taken by a user. In addition, trigger events may occur. For example, a signal threshold may be exceeded, which may trigger a response from an electronic device including a pedometer, such as resetting a count, etc.

It is desirable for a step counter to be accurate in all conditions (e.g., fast walk, slow walk, wrist position, belt position, etc., and various combinations thereof), to have good false positive rejection capabilities (e.g., driving car, motorbike, moving hands, etc), and to have low power consumption, so the use does not need to recharge the device frequently. Accurate step-counts are sometimes difficult to obtain when processing an accelerometer signal with known frequency-domain techniques or time-domain techniques.

It is known to count the number of peaks of an acceleration signal that overcome a threshold, which may be an adaptive threshold. It also is known to reduce false positives by evaluating the time period between peaks after an event detection (a time-domain approach), and to apply a low-pass or adaptive filter on the accelerometer data before counting the peaks (a frequency-domain approach). See U.S. Publication No. 2014/0074431 by Modi.

Current solutions have difficulty providing good performance in all three areas (accuracy, false positive rejection, and low power consumption). Typically, known solutions which deliver good performance in one area have poor performance in another area (e.g., high step counting accuracy, but high power consumption; good false positive rejection, but low step counting accuracy; low power consumption but low step counting accuracy and poor false positive rejection; etc.). In addition, the inventors have recognized that some counting algorithms provide good results only when the sensor in a particular position on the user's body, or have difficulty adjusting to different walking styles (e.g., male/female; walk/run; etc.).

FIG. 1 is a block diagram of an embodiment of a system 100, which, in operation, counts steps. As discussed in more detail below, the system takes into consideration the fact that acceleration data patterns during a walk are related to the position of the accelerometer that logs the data on the body of a user. In an embodiment, a set of device positions on the body are defined, trigger events are defined for each defined position, and a specific statistical classifier is trained for each defined position.

The system 100 as illustrated comprises an accelerometer 102, step detection circuitry 104, step-count processing circuitry 106 and a fastener 108. The accelerometer may be a three-axis accelerometer, which may be, for example, equipped with an internal analog-to-digital converter operating at a sampling rate $f_s$, e.g., 100 Hz, which provides three accelerometric signals to the step detection circuitry 104, namely ax, ay, az, according to axis x, y and z respectively.

The step detection circuitry 104 includes a filter, as illustrated a low-pass filter 120 (other or additional filters, such as a high-pass filter, a band-pass filter, etc., may be employed), an automatic position detector block or circuit 122, an event detector (trigger) block or circuit 124, a classifying block or circuit 126, a consistency check block or circuit 128, an output block or circuit 130 which, in operation, indicates when a step is detected, and a noise rejection block or circuit 132. The low-pass filter 120 filters the signals received from the accelerometer 102.

Figure 5:
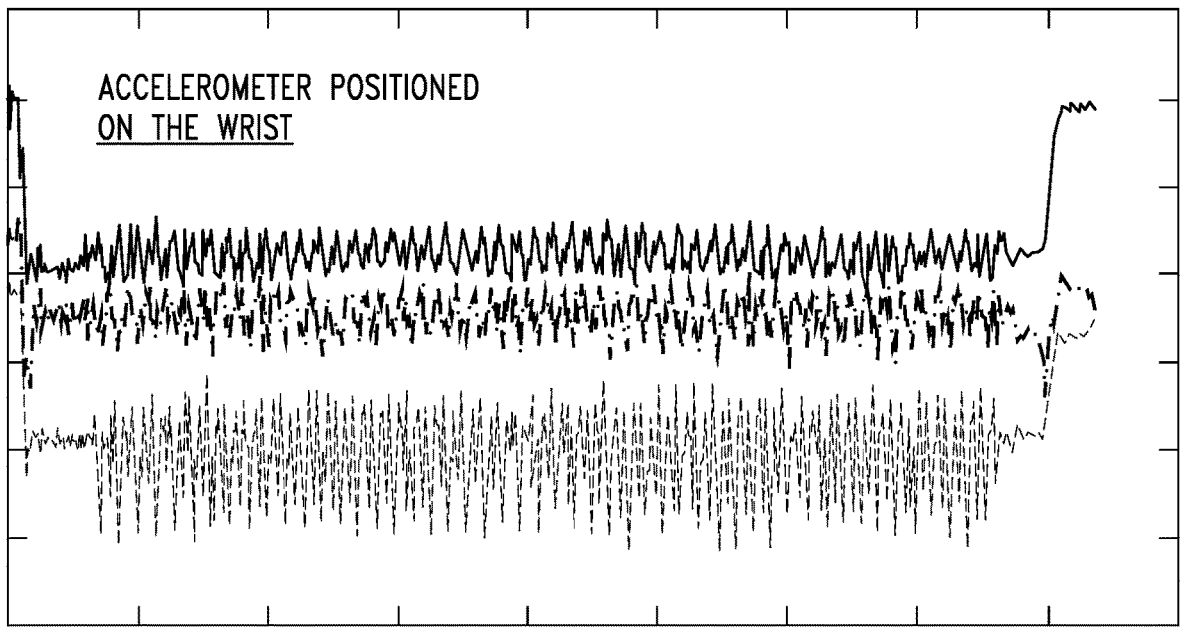
FIG. 5 illustrates example accelerometer signals of an accelerometer positioned on a user's wrist when the user is walking.
Figure 6:
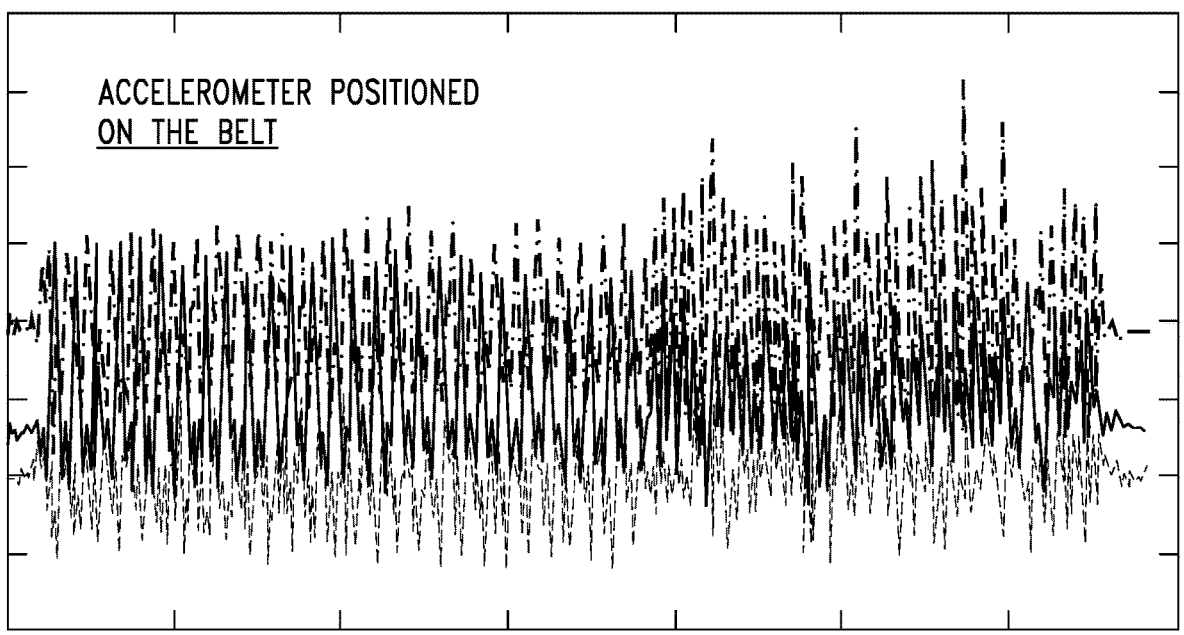
FIG. 6 illustrates example accelerometer signals of an accelerometer positioned on a user's belt when the user is walking.

The position detector block 122, in operation, detects or recognizes a current body position of an accelerometer. The output of the position detector block 122 provides an indication of the detected body position, e.g., a wrist position, a belt position, a chest position, a foot position, a thigh position, etc. The position may be detected based on an analysis of the signal or signals output by the low-pass filter 120, based on user input, etc., and various combinations thereof. For example, FIG. 5 illustrates example accelerometer signals of an accelerometer positioned on a user's wrist when the user is walking, and FIG. 6 illustrates example accelerometer signals of an accelerometer positioned on a user's belt when the user is walking. The position detector can employ various algorithms to detect the position of the accelerometer on the user's body. For example, the magnitudes, averages, means, frequencies, etc., of the accelerometer signals may be compared to thresholds or threshold ranges to determine the position of the accelerometer on the user's body. One or more statistical classifiers trained using training data may be employed to determine the position of the accelerometer (e.g., K-N Neighbor, Support Vector Machines, Neural Networks, Binary Trees, etc.). As illustrated, the indication of the detected current body position of the accelerometer is a position index.

The event detector (trigger) block 124, in operation, receives the position index from the position detector and the one or more signals output by the low-pass filter 120, and triggers the classification block 126 to process the one or more signals output by the low-pass filter 120. For example, the event detection block 124 generates event flags based, for example, on the position index, thresholds, weights, signal processing, and analysis of the signals received from the low-pass filter 120. The thresholds, weights, signal processing and analysis employed in the event detector block 124 may vary based on the position index provided by the position detector 122. In an embodiment, the use of the position index to determine the criteria for event triggers (e.g., to determine the thresholds, weights, signal processing, analysis, etc.) may significantly increase the accuracy of event detection. This is because, for example, an attribute which is a good indicator of an event when an accelerometer is positioned on a user's wrist, may be a bad indicator of an event when the accelerometer is position on user's waist. Thus, the events block may be configured, for example, to assign a high weight to the attribute when the position index indicates the accelerometer is positioned on the user's wrist, and to assign little or no weight to the attribute when the position index indicates the accelerometer is positioned on the user's waist. When a trigger occurs (e.g., when an event flag is generated), an acquisition window is opened to store accelerometer data into buffers (e.g., x-accel, y-accel, z-accel).

The classifier block 126, in operation, receives the position index, the event flag and the accelerometer data stored in the buffers and processes the data to determine whether an event should be classified as a step or a false positive. For example, the classifier block 126 generates step flags based, for example, on thresholds, weights, signal processing, and analysis of the data stored into the buffers. The thresholds, weights signal processing and analysis employed in the classifier block 126 may vary based on the position index provided by the position detector 120 and the event flag provided by the events block. For example, each position index and/or event flag may correspond to use of a different classifier method by the classifier block. In an embodiment, the use of the position index and the event flag to determine the criteria for classification (e.g., to determine the thresholds, weights, signal processing, analysis, etc.) may significantly increase the accuracy of step classification. The classifier classifies an acquired pattern (e.g., stored in the buffers) to determine whether to generate a step flag.

The noise rejection block 132 and the consistency check block 128, in operation, perform mathematical and/or statistical analysis on the one or more signals output by the low-pass filter 120 in order to reduce false positives. For example, a standard deviation on the acceleration signals or data stored in the buffers, a standard deviation on the step frequency, an average of the acceleration signals or the data stored in the buffers, an average of the step frequency, etc., and various combinations thereof may be determined and various thresholds may be employed to determine whether to generate a noise flag. The consistency check block 128 may determine whether to output an indication of a step based on the step flag and the noise flag. In some embodiments, the noise rejection block 132 may also receive the position index and determine whether to generate a noise flag based in part on the position index.

The fastener 108 may comprise, for example, a loop or clip to secure the system 100 to a belt, a wrist strap, a watch strap, a pocket, etc., adhesive pads, fastening arrangement pads (e.g., hooks and loops, such as Velcro®), etc., and various combinations thereof.

Figure 2:
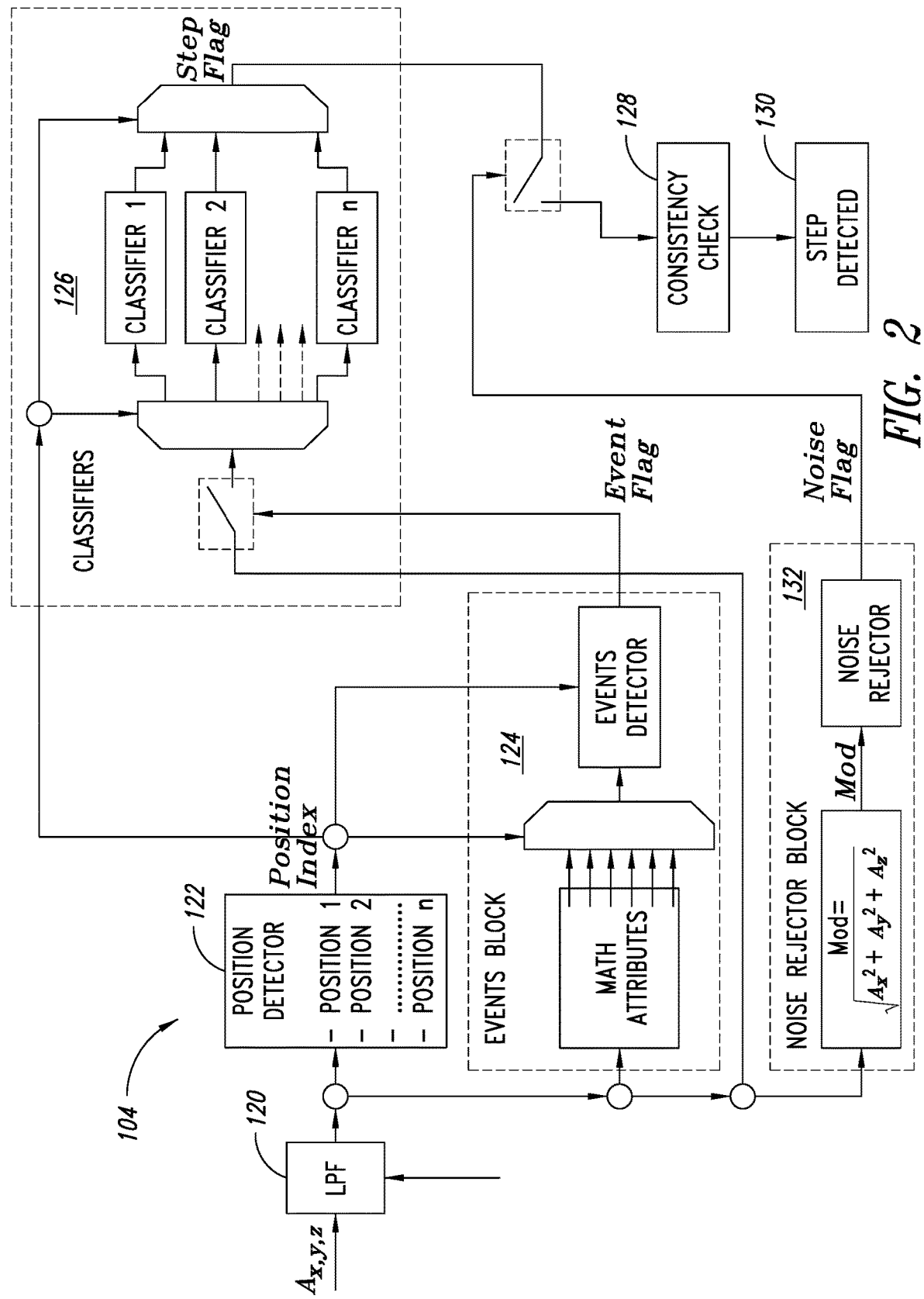
FIG. 2 is a functional block diagram of an embodiment of step detection circuitry.

FIG. 2 is a functional block diagram of an embodiment of step detection circuitry 104, illustrating in more detail example embodiments of an event detector block 124, a classifier block 126, and a noise rejection block 132. The event detector block 124, as illustrated, determines mathematical attributes of the signals received from the low-pass filter 120, selects mathematical attributes to provide to one or more event detectors based on the position index, and determines event detection methods to employ based on the position index.

The classifier block 126, as illustrated, is triggered by event flags to process data stored in the buffers, and determines classifier methods to employ to the data and whether to generate a step flag based on the position index provided by the position detector 122. As illustrated, the classifier block 126 determines a classifier or classifiers to employ (e.g., classifier 1, classifier 2, . . . classifier n) based on the position index. In an embodiment, the classifier(s) associated with a position may be trained with data including position specific positive and false positive patterns or cases, which may facilitate improving both the detection of steps and false positive rejection by the classifier block 126 for each respective position.

The noise rejection block 132, as illustrated, determines a function Mod as follows:

$$Mod = \sqrt{A_x^2 + A_y^2 + A_z^2}$$

The function Mod is then employed to determine whether to generate a noise flag.

Figure 3:
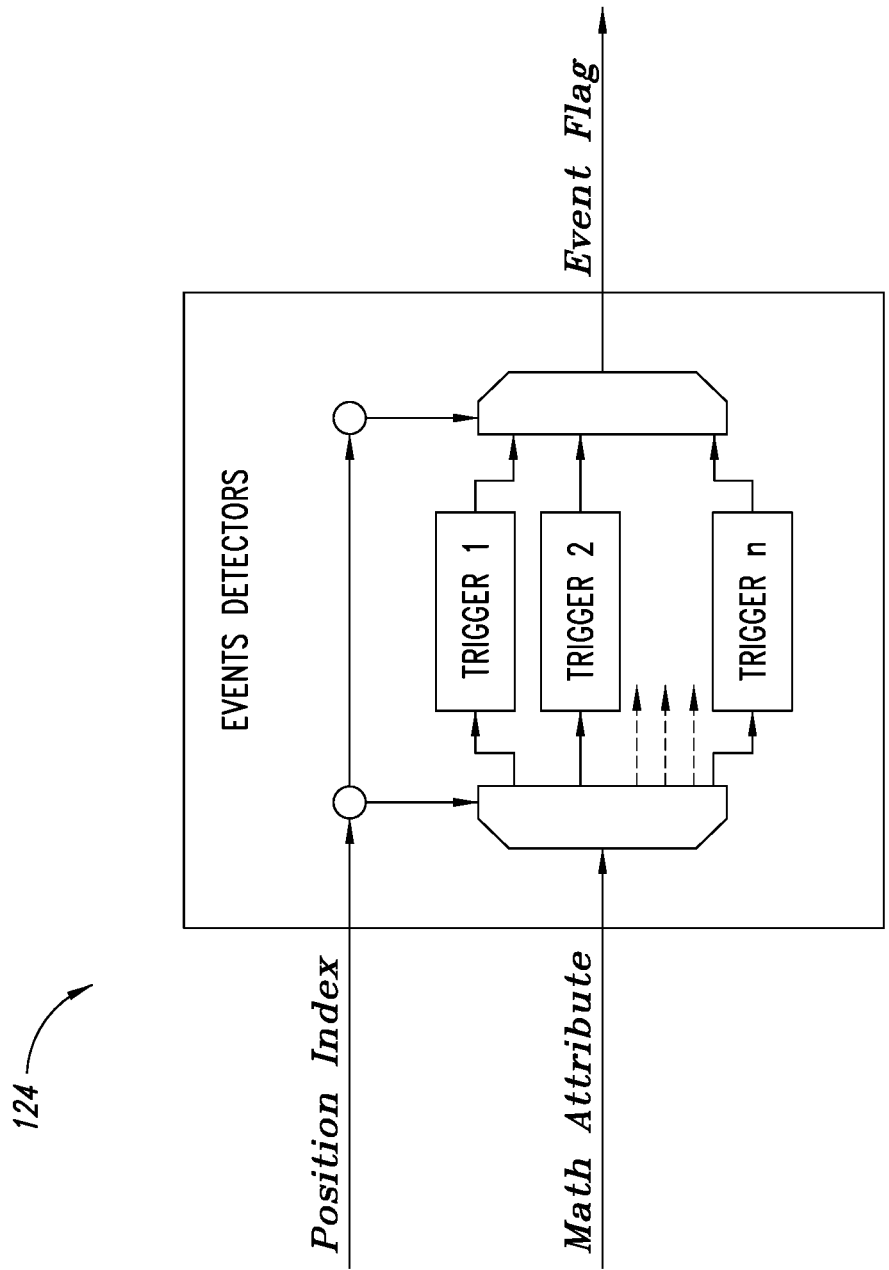
FIG. 3 is a functional block diagram of an embodiment of an event detector.

FIG. 3 illustrates an embodiment of an event detector 124 in more detail. As illustrated, the event detector 124 comprises a plurality of trigger blocks, trigger 1 to trigger n, and receives a position index. The position index is used to determine math attributes to provide to one or more of the trigger blocks and the one or more trigger block outputs to be employed to determine whether to generate an event flag.

Figure 4:
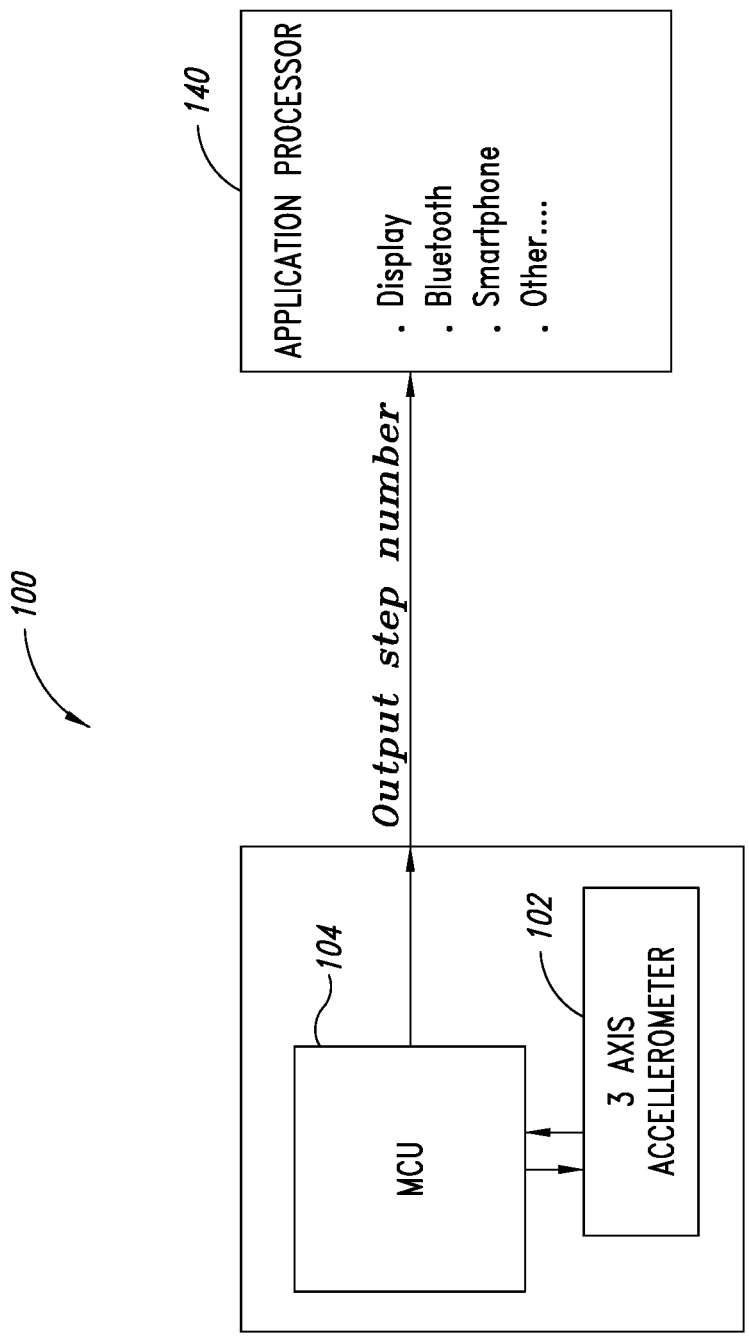
FIG. 4 is a functional block diagram of an embodiment of a system to count steps.

FIG. 4 illustrates an example embodiment of a system 100. The system comprises one or more processors MCU and a 3-axis accelerometer. The one or more processors MCU implement the various blocks or circuits of the step detector circuitry 104. An MCU may include one or more processor cores and one or more memories, which may store, for example, data, instructions, weights, etc. The system 100 generates an output, for example based on a step detection signal from the step detector circuitry 104, which may be a step indicator, a step count number, etc. The output may be displayed by the system 100 on a display (not shown), transmitted by the system 100 by a transmitter (not shown) (e.g., Bluetooth), employed by other blocks of the system 100, such as application processor 140, which may execute one or more applications (e.g., smart phone applications), etc., and various combinations thereof.

Identifying the body position of the accelerometer facilitates providing more accurate step counts and reducing false positives, as discussed above, as well as facilitating improved processor performance and speed by facilitating a reduction in the number of event and classifier detection methods which need to be employed. For example, if it is determined that an accelerometer is being worn on a wrist, there is no need to run event detection and classification schemes designed to detect steps based on an accelerometer positioned on a user's chest. This may reduce the processing power to be employed, the time to make the pertinent determinations, and false positives generated based on chest event detection and classification schemes, while at the same time improving the accuracy of the positive detection of steps.

While embodiments have been described herein with reference to position on a user's body, neural network classifiers (or other types of classifiers such as support vector machines, binary trees, etc.), and step counts, embodiments may detect other external conditions, may determine event trigger and classification criteria to be employed based on such other external conditions, may employ other statistical classifiers, such as K-N Neighbor classifiers, support vector machines, binary trees, etc., and may detect other activities or conditions instead of step counts. In other words, embodiments may employ various types of external conditions, event trigger types and numbers of trigger types, statistical classifier types and numbers of statistical classifiers, and types and numbers of data sets used to train the classifiers, to detect various types of activities.

The methods described herein can be used in system and device to monitor steps in fitness/wellness applications. These systems and devices can be for instance wrist-wearable devices for runners monitoring their workout session. These devices can be wrist-wearable, ear-wearable, smart-watches, smart-headphones, clothing embedded devices, etc., and various combinations thereof.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

Some embodiments may combine illustrated blocks or methods, omit illustrated blocks or methods, include additional blocks or methods and various combinations thereof. For example, in some embodiments the step detection circuitry 104 may not contain a low-pass filter. The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    generating an indication of a condition related to an accelerometer based on one or more accelerometer signals and one or more statistical classifiers trained using training data, wherein the indication of the condition related to the accelerometer is an indication of a body position of the accelerometer;
    generating an event signal based on the one or more accelerometer signals and the indication of the body position of the accelerometer; and
    generating an activity signal based on the event signal, the indication of the body position of the accelerometer and the one or more accelerometer signals.

2. The method of claim 1, comprising:
    generating a noise signal based on the one or more accelerometer signals; and generating the activity signal based on the noise signal.

3. The method of claim 1 wherein the activity signal is a step signal and the method comprises generating a step count signal based on the step signal.

4. The method of claim 3, comprising:
generating a noise signal based on the one or more accelerometer signals; and
generating the step count signal based on the noise signal and the step signal.

5. The method of claim 1 wherein the event signal comprises an event flag, and the method comprises generating the activity signal based on one or more acceleration data blocks associated with the event flag.

6. The method of claim 1, comprising:
controlling an application program based on the activity signal.

7. The method of claim 1 wherein the generating the event signal based on the one or more accelerometer signals and the indication of the body position of the accelerometer comprises selecting event trigger criteria based on the indication of the body position.

8. The method of claim 1 wherein the generating the activity signal based on the event signal, the indication of the body position of the accelerometer and the one or more accelerometer signals comprises selecting a trained statistical classifier from a plurality of trained statistical classifiers based on the indication of the body position.

9. A device, comprising:
an interface configured to receive acceleration signals: and
acceleration signal processing circuitry coupled to the interface, and which, in operation:
generates an indication of a condition related to an accelerometer based on one or more acceleration signals and one or more statistical classifiers trained using training data, wherein the indication of the condition related to the accelerometer is an indication of a body position of the accelerometer;
generates an event signal based on the one or more acceleration signals and the indication of the condition related to the accelerometer; and
generates an activity signal based on the event signal, the indication of the condition related to the accelerometer and the one or more acceleration signals.

10. The device of claim 9 wherein the acceleration signal processing circuitry, in operation,
generates a noise signal based on the one or more acceleration signals; and generates the activity signal based on the noise signal.

11. The device of claim 9 wherein the activity signal is a step signal and the signal processing circuitry, in operation, generates a step count signal based on the step signal.

12. The device of claim 11 wherein the acceleration signal processing circuitry, in operation,
generates a noise signal based on the one or more acceleration signals; and
generates the step count signal based on the noise signal and the step signal.

13. The device of claim 9, comprising:
a plurality of data buffers, wherein the event signal comprises an event flag, and the acceleration signal processing circuitry, in operation, generates the activity signal based on one or more acceleration data blocks associated with the event flag and stored in the plurality of data buffers.

14. The device of claim 9, comprising:
an application processor, which, in operation, controls an application program based on the activity signal.

15. The device of claim 9 wherein the acceleration signal processing circuitry, in operation,
generates the event signal based on the one or more acceleration signals and the indication of the condition related to the accelerometer by selecting event trigger criteria based on the indication of the condition.

16. The device of claim 9 wherein the acceleration signal processing circuitry, in operation,
generates the activity signal based on the event signal, the indication of the condition related to the accelerometer and the one or more acceleration signals by selecting a statistical classifier from a plurality of statistical classifiers based on the indication of the condition.

17. The device of claim 9 wherein the signal processing circuitry comprises:
one or more filters configured to filter received acceleration signals.

18. The device of claim 17 wherein the one or more filters comprise at least one of:
a low-pass filter; and
a high-pass filter.

19. The device of claim 9, comprising:
an accelerometer coupled to the interface and configured to generate the one or more acceleration signals.

20. A method, comprising:
generating an indication of a condition related to an accelerometer based on one or more accelerometer signals, wherein the condition is a body position of the accelerometer;
selecting event trigger criteria based on the indication of the condition related to the accelerometer;
generating an event signal based on the one or more accelerometer signals, the indication of the condition related to the accelerometer and the selected event trigger criteria; and
generating an activity signal based on the event signal, the indication of the condition related to the accelerometer and the one or more accelerometer signals.

21. The method of claim 20, comprising:
generating a noise signal based on the one or more accelerometer signals; and
generating the activity signal based on the noise signal.

22. The method of claim 20 wherein the activity signal is a step signal and the method comprises generating a step count signal based on the step signal.

23. The method of claim 20 wherein the event signal comprises an event flag, and the method comprises generating the activity signal based on one or more acceleration data blocks associated with the event flag.

24. The method of claim 20, comprising using a statistical classifier to generate the indication of a body position.

25. A device, comprising:
an interface configured to receive acceleration signals: and
acceleration signal processing circuitry coupled to the interface, and which, in operation:
generates an indication of a condition related to an accelerometer based on one or more acceleration signals, wherein the condition is a body position of the accelerometer;
selects event trigger criteria based on the indication of the condition related to the accelerometer;
generates an event signal based on the one or more acceleration signals and the indication of the condition related to the accelerometer; and generates an activity signal based on the event signal, the indication of the condition related to the accelerometer and the one or more acceleration signals.

26. The device of claim 25 wherein the acceleration signal processing circuitry, in operation,
generates a noise signal based on the one or more acceleration signals; and
generates the activity signal based on the noise signal.

27. The device of claim 25, comprising:
an accelerometer coupled to the interface and configured to generate the one or more acceleration signals.

28. The device of claim 25, wherein the acceleration signal processing circuitry, in operation, uses one or more statistical classifiers to generate the indication of a body position.

* * * * *